United States Patent Office 2,859,202
Patented Nov. 4, 1958

2,859,202

SILOXANE COMPRISING 2,5-DIMETHYL-2,5-DIHYDROPEROXY HEXANE

William J. Bobear, Latham, N. Y., assignor to General Electric Company, a corporation of New York No Drawing. Application April 10, 1957
Serial No. 651,804

7 Claims. (Cl. 260—46.5)

This invention relates to improved silicones which are convertible to a cured, solid, elastic state. More particularly, it relates to semi-curable compositions comprising silicon-bonded vinyl organopolysiloxanes, and, as a semi-curing agent, 2,5 - dimethyl - 2,5 - dihydroperoxy hexane which can be further fully cured.

Compositions of matter comprising cured, solid, elastic silicon-bonded vinyl-containing organopolysiloxanes or silicone rubbers are widely used in high temperature resistant applications. Such materials and their method of preparation are well known, being described, for example, in Marsden Patent 2,445,794 assigned to the same assignee as the present invention. The above patent discloses the use of benzoyl peroxide as a curing agent for converting to the solid, elastic state alkyl and vinyl-substituted curable organopolysiloxanes. While benzoyl peroxide, as well as other similar materials, is very useful as a curing agent for silicone rubbers where a complete cure is desired in one step, its use is difficult where a semi-cure followed by a final complete cure is indicated. Despite careful control of the amount used and the time and temperature of semi-cure, the use of benzoyl peroxide for semi-curing often results in under cures or over cures, instead of the precise reproducible semi-cured material desired. When the organopolysiloxane is used in solution, the situation is even more complicated because the temperatures used to drive off the solvent, such as toluene, xylene, dioxane and the like, initiates partial decomposition of the benzoyl peroxide and also starts undesirable premature curing of the organopolysiloxane. Attempts have been made to alleviate this condition by adding a minimum amount of the benzoyl peroxide or equivalent curing agent for the required semi-cure and then adding additional benzoyl peroxide for the final cure. Such an expedient is at best makeshift and time-consuming and complicates the preparation of the material and precise control of both the semi-cure and the final cure.

A principal object of the invention is to provide vinyl-containing organopolysiloxane compositions which can be readily and precisely semi-cured.

Briefly, the invention comprises compositions of matter containing vinyl organopolysiloxanes containing from 1.95 to 2.1 organic groups per silicon atom and having from 0.1 to 0.6 mol percent silicon-bonded vinyl groups and a curing agent comprising 2,5-dimethyl-2,5-dihydroperoxy hexane.

The convertible or curable silicone compositions used in the practice of this invention may be highly viscous masses or gummy elastic solids, depending upon their state of condensation, the condensing agent used, the starting organopolysiloxane employed, etc., and are generally herein referred to as convertible organopolysiloxanes or convertible vinyl organopolysiloxanes. Although convertible organopolysiloxanes in general are well known, attention is directed to the convertible organopolysiloxanes disclosed and claimed in Wright et al. Patent 2,448,565, Agens Patent 2,448,756, Krieble et al. Patent 2,457,688, Sprung Patent 2,448,556, Sprung Patent 2,484,595 and Marsden Patent 2,521,528, all assigned to the same assignee as the present invention, and to Hyde Patent 2,490,357, Warrick Patent 2,541,137 and Warrick Patent 2,494,920. Such patents are to be considered in connection with patents such as above cited Patent 2,445,795 which teach the preparation of vinyl-containing organopolysiloxanes.

The convertible vinyl organopolysiloxane compositions of the invention are derived in well-known manners from various organosiloxanes having a ratio of about 1.95 to 2.1 organic groups per silicon atom. While preferably the alkyl group is methyl, it may be other lower alkyl groups, e. g., ethyl, propyl, butyl, etc. Likewise, aryl groups may be included, such as phenyl, xylyl, benzyl, tolyl, chlorophenyl, etc. Although I prefer from the point of view of convenience and availability of material to prepare my convertible vinyl organopolysiloxanes from various tetramers, I can as well prepare them from trimers, pentamers, hexamers and the like.

Preferably, the vinyl organopolysiloxane convertible to the cured, solid, elastic state contains from 0.1 to 0.6 mol percent vinyl groups, from 75 to 99.9 mol percent alkyl groups, preferably lower alkyl groups such as methyl and ethyl groups, and from 0 to 24.4 mol percent aryl groups, the total molar concentration equaling 100 percent, all the foregoing organic radicals being attached to silicon by carbon-silicon linkages. Advantageously, the silicon atoms of the vinyl organopolysiloxane contain organic radicals, at least 75 percent, and preferably 90 percent, of which are lower alkyl radicals in the form of, for instance, $R_2SiO$, where R is a lower alkyl radical.

The convertible vinyl organopolysiloxane can be made in any of a number of ways, and the following is exemplary of such methods, all parts being by weight. Octamethylcyclotetrasiloxane in the amount of 100 parts is mixed with 15 parts of octaphenylcyclotetrasiloxane and heated to about 130° C. Thereafter, 0.23 part 1,3,5,7 - tetramethyl-1,3,5,7-tetravinylcyclotetrasiloxane is added to the mixture with about 0.01 percent, by weight, KOH, based on the total weight of the organopolysiloxanes, and the mixture heated for about 5 hours with stirring at 165° C. to 175° C. The KOH is neutralized with trichloroethylphosphite at 175° C. and devolatilized to produce a convertible methyl phenyl vinyl polysiloxane containing an average of about 2 organic groups to each silicone atom and about 0.2 mol percent of vinyl groups. In the preparation of another such material containing only alkyl groups in addition to vinyl groups, 100 parts of octamethylcyclotetrasiloxane and 0.23 part 1,3,5,7 - tetramethyl - 1,3,5,7-tetravinyl cyclotetrasiloxane are condensed using 0.01 percent by weight KOH, based on the total weight of the organopolysiloxanes, and the mixture again heated for about 5 hours with stirring at 165° C. to 175° C., the KOH being again neutralized as with trichloroethylphosphite and devolatilized to produce a methyl vinyl silicone containing about 0.2 mol percent vinyl groups.

It will be realized, of course, that the various constituents described above, as well as others which are equivalent thereto, may be varied in an amount to give varying characteristics. The temperature at which the reaction is carried out can also be varied, e. g., from about 140° C. to about 180° C. and the time of reaction from about 1½ to 5 hours, depending upon the temperature, ingredients used, the type of product desired, etc. The condensing agent can also be varied and includes, besides potassium hydroxide, sodium hydroxide, ferric chloride hexahydrate, phenylphosphoryl chloride, etc.

The convertible vinyl organopolysiloxanes described herein can be compounded in an ordinary rubber compounding mill, in a dough mixer or in a Banbury mixer with various fillers, for example, finely divided silicas, silica aerogel, finely divided fumed silica, etc., titanium dioxide, calcium silicate, ferric oxide, chromic oxide, cadmium sulfide, asbestos, glass fibers, calcium carbonate, carbon black, lithopone, talc, etc., and molded, extruded, cast or otherwise shaped, as by heating under pressure, to form products having physical characteristics such as elasticity, compressibility, etc., similar to those of natural rubber and other synthetic rubbers. Alternatively, solutions or dispersions of the convertible vinyl organopolysiloxane with or without filler and containing the 2,5-dimethyl-2,5-dihydroperoxy hexane curing agent may be prepared for coating and impregnating purposes. Among such inert solvents or dispersing media may be mentioned toluene, xylene, benzene, chlorobenzene, etc. which are preferably used in conjunction with a polar solvent, including alkyl alcohols, ketones, etc., such solutions or dispersions comprising from about 10 to 50 percent solids content, considering as solids all the material in the solution or dispersion other than the liquid solvent or dispersing medium. Generally speaking, the convertible vinyl organopolysiloxanes of this invention are prepared by mixing on rubber mill rolls, in a dough mixer, etc. 100 parts by weight vinyl organopolysiloxane gum, from about 40 to 70 parts by weight of filler and about 4 parts by weight of diphenylsilanediol for about 1 hour at a temperature of from 110° to 115° C. At this point about 1 to 10 parts by weight 2,5-dimethyl-2,5-dihydroperoxy hexane is added to the material with further mixing. It will be realized, of course, that the time of mixing may be varied considerably, such time at higher temperatures being shorter and longer at low temperatures. The mixed material is semi-cured by heating for about 10 minutes at temperatures varying from about 150° C. to 200° C., it again being realized that the material may be semi-cured in a shorter time at higher temperatures and in a longer time at lower temperatures and that various degrees of semi-curing to suit any particular need can be obtained. In order to effect the final cure, the material is treated with an ordinary curing agent, i. e., benzoyl peroxide such as a 5 percent solution in an inert solvent such as toluene, and air dried and thereafter cured in the usual way under heat and under pressure if desired. The following examples will illustrate the practice of the invention.

To 100 parts by weight of methyl vinyl gum, having the vinyl content indicated in Tables I–III, there were added 40 parts by weight of finely divided silica and 4 parts by weight diphenylsilanediol. The materials were doughmixed for 1 hour at a temperature of 110° to 150° C., the diphenylsilanediol being used as a structure reducing agent as described in copending application Serial No. 399,148 filed December 8, 1953, now Patent No. 2,803,234, assigned to the same assignee as this invention. To the above material there were next added 5 parts by weight 2,5-dimethyl-2,5-dihydroperoxy hexane after which the ingredients were mixed on a rubber mill. The catalyzed compound was then calendered to a thickness of about 20 mils on vinyl silane sized glass cloth which had been primed with an organopolysiloxane compound such as those described above and in the referenced patents, the priming being carried out by dipping the cloth in a 10 percent toluene solution of the organopolysiloxane after which the cloth was air dried and cured for 10 minutes at 150° C. and for 10 minutes at 250° C. The calendered tapes were semi-cured for 10 minutes at the temperature indicated in the tables below and were then dipped in a 5 percent solution of benzoyl peroxide in toluene, withdrawn from the solution and air dried. The tapes were next formed into a double laminate and press cured for 10 minutes at 150° C. and under a pressure of 100 lbs. per sq. in. One inch wide samples from these laminates were peeled apart using a Scott tester and a pull of 2 inches per minute, the result being recorded as the pounds of pull per linear inch of width of the sample. Table I below sets forth various examples using a convertible vinyl organopolysiloxane containing 0.20 percent vinyl.

*Table I*

[0.2 mol percent vinyl.]

| Example | Semi-Curing Temperature | Semi-Cure | Breaking Strength (#/in.) | Type Failure |
|---|---|---|---|---|
| 1 | 150 | Slight | 6.6 | Cohesive. |
| 2 | 175 | Good | 9.5 | Do. |
| 3 | 200 | ----do | 7.6 | Do. |
| 4 | 250 | Too fully cured | 7.9 | Do. |

Table II below relates to examples prepared similarly to those of Table I except that the vinyl content was 0.6 mol percent vinyl.

*Table II*

| Example | Semi-Curing Temperature | Semi-Cure | Breaking Strength (#/in.) | Type Failure |
|---|---|---|---|---|
| 5 | 150 | Slight | 5.0 | Adhesive. |
| 6 | 175 | Good | 3.8 | Do. |
| 7 | 200 | ----do | 6.0 | Do. |
| 8 | 250 | Too fully cured | 3.1 | Do. |

Table III below illustrates examples prepared similarly to those of Table I except that the vinyl content was 0.8 mol percent vinyl.

*Table III*

| Example | Semi-Curing Temperature | Semi-Cure | Breaking Strength (#/in.) | Type Failure |
|---|---|---|---|---|
| 9 | 150 | Fair | 2.5 | Adhesive. |
| 10 | 175 | Good | 2.8 | Do. |
| 11 | 200 | ----do | 2.9 | Do. |
| 12 | 250 | Too fully cured | 3.4 | Do. |

From the data shown in Tables I through III above, it will be apparent that from 0.2 to 0.6 mol percent vinyl content in the organopolysiloxane is most efficacious since failure of the laminates formed with such material when pulled apart was cohesive or in the silicone and at a high level of strength. At a vinyl content of 0.6 mol percent upward, the failure of laminates when pulled apart was at a low level of strength and adhesive in character, that is, the failure was on the base cloth rather than in the silicone.

The following examples illustrate the effect of varying the amount of semi-curing agent or 2,5-dimethyl-2,5-dihydroperoxy hexane. Example 2 was repeated in every detail except that the amount of 2,5-dimethyl-2,5-dihydroperoxy hexane (DDPH) was varied as shown in Table IV below, the semi-curing being carried out in each case for 10 minutes at a temperature of 175° C.

*Table IV*

| Example | Parts DDPH | Semi-Cure | Breaking Strength (#/in.) | Type Failure |
|---|---|---|---|---|
| 13 | 1 | Very slight | 13.3 | Cohesive. |
| 14 | 2.5 | Slight | 13.3 | Do. |
| 15 | 5 | Good | 8.8 | Do. |
| 16 | 10 | ----do | 10.3 | Do. |
| 17 | 15 | ----do | 6.6 | Adhesive. |
| 18 | 20 | ----do | 7.0 | Do. |

It will be quite evident that the amount of semi-curing agent or 2,5-dimethyl-2,5-dihydroperoxy hexane (DDPH) can be advantageously varied from 1 to 10 parts by weight, the type failure in each case being of the cohesive type. However, it will also be noted that when over 10 parts by weight of 2,5-dimethyl-2,5-dihydroperoxy hexane are used, the failure becomes adhesive in nature or a failure in adhesion to the cloth rather than in the silicone.

In addition to the fillers set forth above, it will be obvious that other fillers may be used in varying amounts depending on the filler employed, its particle size and the specific convertible vinyl-containing organopolysiloxane used, the purpose for which the finished product is to be used, etc. Thus, the filled material may be produced containing, for example, from about 20 percent to 300 percent by weight of filler based on the entire weight of filled material. The examples set forth in Table V below demonstrate that the particular amount of filler used in conjunction with the present semi-curing agent is not critical and may be varied as desired. In each case, the examples were prepared exactly as in the case of Example 2 except that the amount of silica filler was varied from 30 parts by weight to 50 parts by weight.

Table V

| Example | Filler (Parts by Weight) | Semi-Cure | Breaking Strength (#/in.) | Type Failure |
| --- | --- | --- | --- | --- |
| 19 | 30 | Good | 8.5 | Cohesive. |
| 20 | 40 | do | 9.4 | Do. |
| 21 | 50 | do | 9.6 | Do. |

It has been found that non-vinyl containing organopolysiloxane gums are not semi-cured by the use of 2,5-dimethyl-2,5-dihydroperoxy hexane. For example, 100 parts by weight of an organopolysiloxane, prepared by condensing octamethylcyclotetrasiloxane at a temperature of from 150° C. to 175° C. for about 4 hours with about 0.01 percent potassium hydroxide, based on the weight of the siloxane, to a gummy state, were combined with 40 parts by weight of a finely divided silica and 4 parts by weight of diphenylsilanediol and doughmixed for one hour at 110° C. to 115° C. At this point, 5 parts by weight of 2,5-dimethyl-2,5-dihydroperoxy hexane were blended into the mixture on a rubber mill after which the material was calendered on glass cloth as above to a thickness of about 20 mils. No cure whatsoever of the material was obtained when the cloth was heated to a temperature of 175° C. for 10 minutes.

The fact that organopolysiloxanes containing no vinyl groups are not semi-cured by the use of 2,5-dimethyl-2,5-dihydroperoxy hexane is further illustrated by the fact that when 100 parts by weight of the organopolysiloxane described above were combined with 50 parts by weight of calcium carbonate and 5 parts by weight of ethyl silicate, doughmixed for one hour at 130° C. and treated with 2,5-dimethyl-2,5-dihydroperoxy hexane in a similar manner, applied to a cloth and heated for 10 minutes at 175° C., no cure was obtained.

According to the present invention, there are prepared vinyl-containing convertible organopolysiloxanes which can be semi-cured for convenience and easier handling and then finally fully cured at a later date. The materials are useful as molding compounds which can be dried and compounded without the necessity of exercising undue caution to prevent premature curing of the organopolysiloxane containing 2,5-dimethyl-2,5-dihydroperoxy hexane and which may be final cured by the addition thereto of more conventional curing agents such as benzoyl peroxide, etc. The products of the invention may conveniently be employed in the making of tapes which are useful for electrical insulation and which can readily be wound upon themselves without sticking. They may be used to coat and impregnate, besides glass cloth, other sheet material including paper, asbestos cloth, nylon, etc., these materials being treated with the material and thereafter processed to provide useful products either as such or by the addition of a final curing agent.

What I claim as new and desire to secure by Letters Patent of the United States is:

1. A porous sheet material coated and impregnated with a composition comprising (1) an organopolysiloxane convertible to the cured, solid, elastic state consisting of from about 75 to 99.9 mol percent lower alkyl groups and from about 0.1 to 0.6 mol percent vinyl groups, any other organic groups present in the aforesaid organopolysiloxane being selected from the class consisting of aryl groups, halogenated aryl groups, and mixtures thereof, the total molar concentration of organic groups being equal to 100 percent, all the organic groups being attached to silicon by carbon-silicon linkages, there being present an average of from 1.95 to 2.1 organic groups per silicon atom (2) a filler and (3) a semi-curing agent for (1) consisting of from 1 to 10 percent of 2,5-dimethyl-2,5-dihydroperoxy hexane based on the weight of (1).

2. The process of forming a semi-cured tape material which comprises coating and impregnating a porous tape structure with a composition comprising (1) an organopolysiloxane convertible to the cured, solid elastic state consisting of from about 75 to 99.9 mol percent lower alkyl groups and from about 0.1 to 0.6 mol percent vinyl groups, any other organic groups present in the aforesaid organopolysiloxane being selected from the class consisting of aryl groups, halogenated aryl groups, and mixtures thereof, the total molar concentration of organic groups being equal to 100 percent, all the organic groups being attached to silicon by carbon-silicon linkages, there being present an average of from 1.95 to 2.1 organic groups per silicon atom (2) a filler and (3) a semi-curing agent for (1) consisting of from 1 to 10 percent of 2,5-dimethyl-2,5-dihydroperoxy hexane based on the weight of (1) and heating said structure to a semi-cured state.

3. A composition of matter comprising (1) an organopolysiloxane convertible to the cured, solid, elastic state consisting of from about 75 to 99.9 mol percent lower alkyl groups and from about 0.1 to 0.6 mol percent vinyl groups, any other organic groups present in the aforesaid organopolysiloxane being selected from the class consisting of aryl groups, halogenated aryl groups, and mixtures thereof, the total molar concentration of organic groups being equal to 100 percent, all the organic groups being attached to silicon by carbon-silicon linkages, there being present an average of from 1.95 to 2.1 organic groups per silicon atom (2) diphenylsilanediol and (3) a semi-curing agent for said organopolysiloxane consisting of from 1 to 10 percent of 2,5-dimethyl-2,5-dihydroperoxy hexane based on the weight of said organopolysiloxane.

4. A composition of matter comprising (1) an organopolysiloxane convertible to the cured, solid, elastic state consisting of from about 75 to 99.9 mol percent lower alkyl groups and from about 0.1 to 0.6 mol percent vinyl groups, any other organic groups present in the aforesaid organopolysiloxane being selected from the class consisting of aryl groups, halogenated aryl groups, and mixtures thereof, the total molar concentration of organic groups being equal to 100 percent, all the organic groups being attached to silicon by carbon-silicon linkages, there being present an average of from 1.95 to 2.1 organic groups per silicon atom (2) a filler (3) diphenylsilanediol and (4) a semi-curing agent for (1) consisting of from 1 to 10 percent of 2,5-dimethyl-2,5-dihydroperoxy hexane based on the weight of (1).

5. A composition of matter comprising (1) an organopolysiloxane convertible to the cured, solid, elastic state containing from about 75 to 99.9 mol percent lower alkyl groups and from about 0.1 to 0.6 mol percent vinyl groups, any other organic groups present in the aforesaid organopolysiloxane being selected from the class consisting of aryl groups, halogenated aryl groups, and mixtures thereof, the total molar concentration of organic groups being equal to 100 percent, all the organic groups being attached to silicon by carbon-silicon linkages, there being present an average of from 1.95 to 2.1 organic groups per silicon atom (2) a silica filler (3) diphenylsilanediol and (4) a semicuring agent for (1) consisting of 1 to 10 percent of 2,5-dimethyl-2,5-dihydroperoxy hexane based on the weight of (1).

6. A composition of matter comprising (1) an organopolysiloxane convertible to the cured, solid, elastic state consisting of from about 75 to 99.9 mol percent lower alkyl groups and from about 0.1 to 0.6 mol percent vinyl groups, any other organic groups present in the aforesaid organopolysiloxane being selected from the class consisting of aryl groups, halogenated aryl groups, and mixtures thereof, the total molar concentration of organic groups being equal to 100 percent, all the organic groups being attached to silicon by carbon-silicon linkages, there being present an average of from 1.95 to 2.1 organic groups per silicon atom (2) a semi-curing agent for (1) consisting of from 1 to 10 percent of 2,5-dimethyl-2,5-dihydroperoxy hexane based on the weight of (1).

7. A composition of matter comprising (1) an organopolysiloxane convertible to the cured, solid, elastic state consisting of from about 75 to 99.9 mol percent lower alkyl groups and from about 0.1 to 0.6 mol percent vinyl groups, any other organic groups present in the aforesaid organopolysiloxane being selected from the class consisting of aryl groups, halogenated aryl groups, and mixtures thereof, the total molar concentration of organic groups being equal to 100 percent, all the organic groups being attached to silicon by carbon-silicon linkages, there being present an average of from 1.95 to 2.1 organic groups per silicon atom (2) a filler and (3) a semi-curing agent for (1) consisting of from 1 to 10 percent of 2,5-dimethyl-2,5-dihydroperoxy hexane based on the weight of (1).

References Cited in the file of this patent

UNITED STATES PATENTS 2,789,155   Marshall et al. _____ Apr. 16, 1957

OTHER REFERENCES

Encyclopedia of Chem. Technology, vol. 10 (1953), pages 58–61.